United States Patent
Biermann

(10) Patent No.: US 10,870,329 B2
(45) Date of Patent: Dec. 22, 2020

(54) VENTILATION DEVICE FOR AN INTERIOR OF A MOTOR VEHICLE AND METHOD FOR OPERATING A VENTILATION DEVICE OF THIS KIND

(71) Applicant: Bayerische Motoren Werke Aktiengesellschaft, Munich (DE)

(72) Inventor: Jan Biermann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/515,655

(22) Filed: Jul. 18, 2019

(65) Prior Publication Data
US 2019/0337357 A1 Nov. 7, 2019

Related U.S. Application Data

(63) Continuation of application No. PCT/EP2018/050399, filed on Jan. 9, 2018.

(30) Foreign Application Priority Data
Jan. 19, 2017 (DE) .................. 10 2017 200 822

(51) Int. Cl.
*G10K 11/178* (2006.01)
*B60H 1/00* (2006.01)
*F24F 13/24* (2006.01)

(52) U.S. Cl.
CPC ......... *B60H 1/00507* (2013.01); *F24F 13/24* (2013.01); *G10K 11/178* (2013.01); *B60H 2001/006* (2013.01); *F24F 2013/247* (2013.01)

(58) Field of Classification Search
CPC .... G10K 11/16; G10K 11/175; G10K 11/178; G10K 2210/128; G10K 2210/12821;
(Continued)

(56) References Cited

U.S. PATENT DOCUMENTS 4,665,549 A * 5/1987 Eriksson ............... G10K 11/178
381/71.5
5,517,571 A * 5/1996 Saruta .................. G10K 11/178
381/71.11
(Continued)

FOREIGN PATENT DOCUMENTS

DE 198 32 979 C1 11/1999
DE 198 32 517 A1 1/2000
(Continued)

OTHER PUBLICATIONS

PCT/EP2018/050399, International Search Report dated Mar. 15, 2018 (Two (2) pages).
(Continued)

*Primary Examiner* — Thang V Tran
(74) *Attorney, Agent, or Firm* — Crowell & Moring LLP

(57) ABSTRACT

A ventilation device for an interior of a motor vehicle includes a ducting system with at least one air duct and a blower via which an air flow can be generated in the ducting system. To allow active ventilation of the interior at particularly low noise levels, at least one sound transducer of the ventilation device is provided via which a sound pressure in the ducting system can be detected and a signal corresponding to the sound pressure detected can be transmitted to at least one second sound transducer of the ventilation device. In order to reduce the sound pressure, a counter sound pressure depending on the signal in the ducting system can be generated by the at least one second sound transducer.

11 Claims, 3 Drawing Sheets

(58) Field of Classification Search
CPC . G10K 2210/12822; G10K 2210/3219; G10K 2210/10; G10K 2210/509; B60H 1/00507; B60H 2001/006; F24F 13/24; F24F 2013/247; H04R 3/00; H04R 3/04
See application file for complete search history.

(56) References Cited

U.S. PATENT DOCUMENTS

| | | | |
|---|---|---|---|
| 5,602,926 A * | 2/1997 | Ohashi | G10K 11/17815 381/71.5 |
| 5,636,286 A * | 6/1997 | Makabe | G10K 11/178 381/71.5 |
| 9,396,718 B2 | 7/2016 | Paul et al. | |
| 2002/0080978 A1* | 6/2002 | Kakuhari | G10K 11/178 381/71.5 |
| 2009/0180635 A1 | 7/2009 | Gross et al. | |
| 2010/0028134 A1* | 2/2010 | Slapak | F24F 13/24 415/119 |
| 2014/0133667 A1* | 5/2014 | Moller | G10K 11/178 381/71.5 |
| 2017/0276398 A1* | 9/2017 | Hanazono | F24F 13/24 |
| 2018/0301136 A1* | 10/2018 | Nguyen | F02C 7/00 |

FOREIGN PATENT DOCUMENTS

| | | |
|---|---|---|
| DE | 10 2005 057 399 A1 | 6/2007 |
| DE | 10 2012 212 843 A1 | 1/2014 |

OTHER PUBLICATIONS

German Search Report issued in German counterpart application No. 10 2017 200 822.9 dated Aug. 14, 2017, with Statement of Relevancy (Eight (8) pages).

* cited by examiner

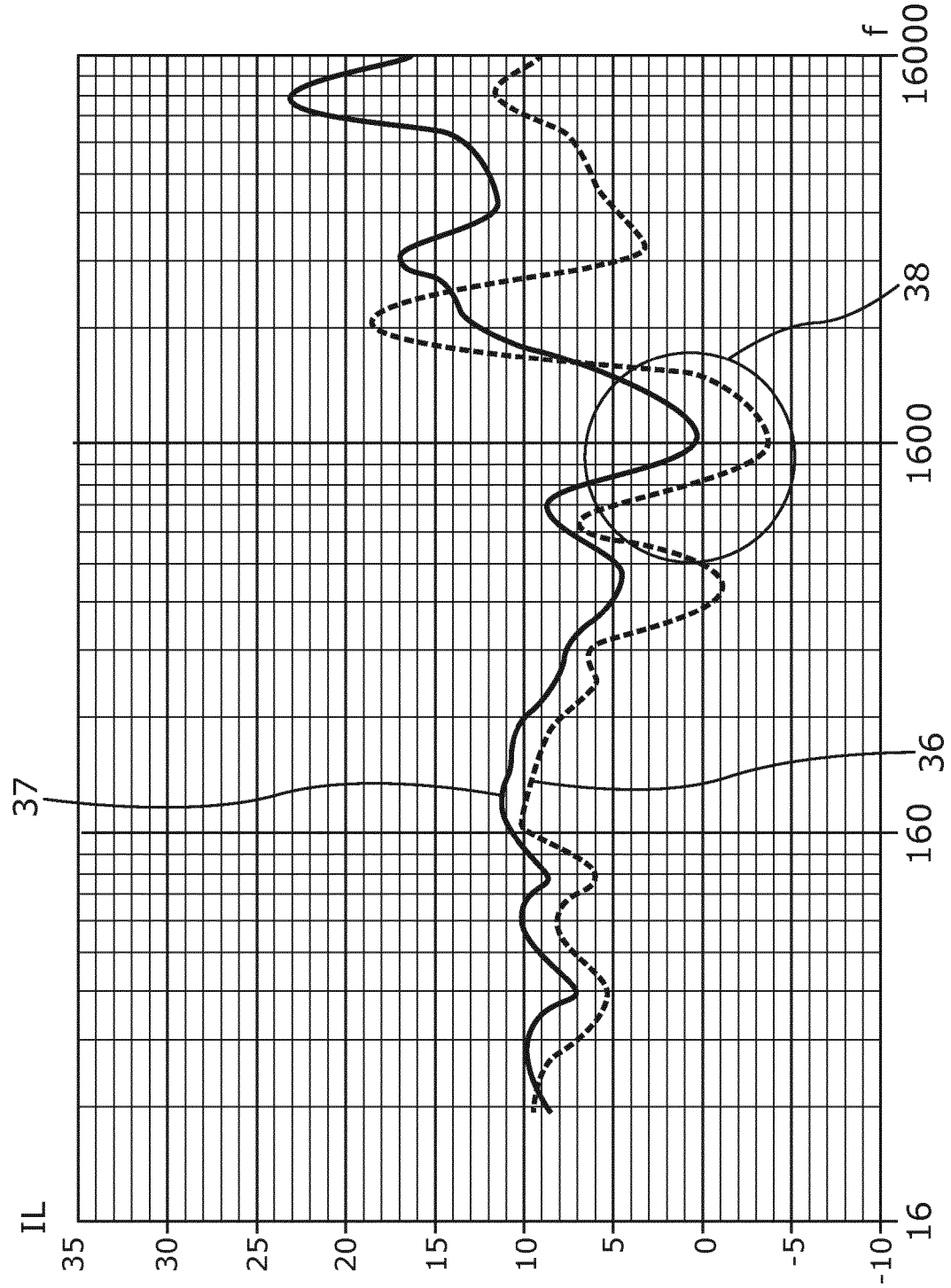

VENTILATION DEVICE FOR AN INTERIOR OF A MOTOR VEHICLE AND METHOD FOR OPERATING A VENTILATION DEVICE OF THIS KIND

CROSS REFERENCE TO RELATED APPLICATIONS

This application is a continuation of PCT International Application No. PCT/EP2018/050399, filed Jan. 9, 2018, which claims priority under 35 U.S.C. § 119 from German Patent Application No. 10 2017 200 822.9, filed Jan. 19, 2017, the entire disclosures of which are herein expressly incorporated by reference.

BACKGROUND AND SUMMARY OF THE INVENTION

The invention relates to a ventilation device for an interior compartment of a motor vehicle and to a method for operating a ventilation device of this type.

Ventilation devices, air-conditioning systems and the like that are found in motor vehicles nowadays are designed for a wide range of different conditions. At least over a major part of the corresponding operating conditions, a blower noise of the ventilation device or air-conditioning system dominates the acoustic overall impression for respective vehicle occupants. Here, there is often only very limited structural space available for known passive acoustic measures, such as for example absorbers, in order to counteract this problem of the undesirably high sound intensity of the ventilation device. This problem is intensified at present, and is anticipated to be intensified in the future development of motor vehicles, by a noticeable proliferation, which is expected to increase, of electrified vehicles and purely electric automobiles, in which the masking noises known from conventional motor vehicles, which are generated by the respective internal combustion engine therein, are eliminated.

Here, the blower noise is inherently associated with the function of the generation of an air stream, which is indispensable for ventilation devices. This noise cannot be reduced to a sufficient extent for example by reducing a rotational speed of the blower. Furthermore, respective air guides and air-distributing elements contribute passively, that is to say without for example themselves being actively moved, to the overall noise of the respective ventilation device or air-conditioning system that is perceptible in the interior compartment of the motor vehicle. There is often also the problem that, in particular owing to air-distributing elements and/or measures, not only is there a resulting acoustic transmission of noises of the ventilation device or air-conditioning system into the interior compartment of the motor vehicle with a level which is undesirably high therein, but here, there is also a noise quality which is often perceived to be distracting or unpleasant.

It is an object of the present invention to permit active ventilation of an interior compartment of a motor vehicle with a particularly low sound intensity and/or particularly high-quality noise pattern.

A ventilation device according to the invention for an interior compartment of a motor vehicle or for ventilating an interior compartment of a motor vehicle comprises a channel system, which itself comprises at least one air channel, and a blower, by means of which an air stream can be generated in the channel system. To permit active ventilation of the interior compartment of the motor vehicle with a particularly low sound intensity, provision is made according to the invention whereby the ventilation device comprises at least one first sound transducer and at least one second sound transducer. Here, by means of the at least one first sound transducer, a sound pressure in the channel system, in particular in the air channel, can be detected. Here, the at least one first sound transducer provides a signal or an output signal which corresponds to and/or correlates with the detected sound pressure. The signal can then be transmitted directly or indirectly to the at least one second sound transducer of the ventilation device. The signal can be transmitted from the at least one first sound transducer firstly to an evaluation device or a control unit, which processes the signal and in turn transmits a corresponding control signal to the at least one second sound transducer of the ventilation device. The evaluation device and/or the control unit may alternatively be regarded as part of the at least one first and/or of the at least one second sound transducer, or may be such a part. By means of the at least one second sound transducer, in a manner dependent on the signal or in a manner dependent on the control signal, an antisound pressure can be generated in the channel system, in particular as close to the source as possible, that is to say in a vicinity of the blower, in order to reduce the sound pressure prevailing or present there. In other words, the ventilation device according to the invention thus comprises an antisound system (ANC, "active noise cancellation"), which constitutes a system for active noise minimization or suppression.

The reduction of the sound pressure and thus the minimization or suppression of the sound or the corresponding noises is based on the functional principle of destructive interference. The ventilation device—or the antisound system—may have a regulator functionally coupled to the at least one second sound transducer. It is advantageously then possible for the at least one first sound transducer, the at least one second sound transducer and the regulator to be formed or arranged as part of a closed control loop. By means of the ventilation device, it is thus possible for closed-loop and/or open-loop control of the ventilation device, in particular of the at least one second sound transducer, which is optimized with regard to a noise or noise level, or a corresponding noise sound intensity, generated in the interior compartment by the ventilation device to be realized automatically, that is to say without active intervention for example by an occupant of the motor vehicle.

The ventilation device according to the invention is advantageously designed and configured to reduce the sound pressure or sound pressure level in the channel system of the ventilation device, which directly also results in a reduction of the sound pressure or of the sound pressure level in the interior compartment of the motor vehicle. From the perspective of the respective occupant of the motor vehicle, active ventilation of the interior compartment of the motor vehicle is thus provided which is quieter in relation to known ventilation devices. Through the possibility of the active and monitored control of the at least one second sound transducer, the operational noise of the ventilation device according to the invention can be not only reduced but controlled or adapted in targeted fashion. In this way, it is thus possible in a particularly advantageous manner for the coupling that exists in the case of known ventilation devices between an acoustic transmission characteristic in particular of the channel system and the noise quality of the ventilation device that is perceptible in the interior compartment of the motor vehicle to be reduced or at least partially eliminated. The respective acoustic transmission characteristic of the channel system and of the ventilation device is determined significantly by the geometrical form thereof and functionally required devices and components such as for example air-guiding or air-distributing elements, a flap box and the like, and thus by at least substantially devices, circumstances and/or conditions required for the ventilation device or for example for functions relevant for air-conditioning comfort.

By means of the present invention, it is possible in a particularly advantageous manner, despite these restrictions and boundary conditions, for increased design freedom in relation to conventional known ventilation devices, for example with regard to respective shaping and/or arrangement of individual elements and components of the ventilation device, to be achieved or made possible with simultaneously reduced sound intensity and/or increased acoustic quality.

The at least one first sound transducer may for example be or comprise a microphone. The at least one second sound transducer may for example be or comprise a loudspeaker. The signal corresponding to the detected sound pressure may for example be transmitted via a corresponding data line, wherein the at least one second sound transducer is configured for receiving the signal or an appropriate control signal corresponding to the signal. The at least one first sound transducer and/or the at least one second sound transducer may preferably be arranged in a vicinity of the blower. In the case of such an arrangement, the sound generated by the blower or arising in or at the blower or a corresponding sound field is advantageously not influenced, or is influenced by an extremely small amount or to an extremely small extent, by other components or elements of the ventilation device before the sound or the sound field arrives at the at least one first sound transducer and/or at the at least one second sound transducer. In this way, the reduction of the corresponding sound pressure provided according to the invention can be achieved or realized in a particularly simple manner with particularly little outlay. Here, the outlay may be kept low in particular by virtue of the ANC system being arranged close to the blower in the ventilation device or in the channel system, because, in this case, particularly few active components are required for the ANC system.

The channel system may comprise one or more air channels. Different air channels may for example lead to different air outlets or vents, through which the air stream can pass over, or is coupled in, from the channel system into the interior compartment of the motor vehicle.

In a further advantageous configurations of the present invention, provision is made whereby the at least one air channel is divided by means of at least one separating element into multiple partial channels, which, in particular parallel to a flow direction of the air stream, are delimited with respect to one another in air-impermeable fashion at least in regions. This division is in this case provided in particular in a region in which the sound or sound pressure is reduced or is to be reduced. In other words, by means of the at least one separating element, two flow regions which are separate at least in regions or in portions are thus formed or generated in the respective one air channel. It is thus possible for the air stream flowing through the air channel to pass from the blower for example to an air outlet or vent, which constitutes an end of the air channel averted from the blower, in two partial air streams which at least regionally do not influence one another. The two partial air channels may preferably be of identical shape and identical cross section, and may in particular run or be arranged parallel to one another.

The separating element may for example be a separating wall or an intermediate wall. The separating element may extend all the way through the air channel for example from one side or delimiting surface to an opposite side or delimiting surface. As a result of the division of the air channel into two or more partial channels or chambers, it is possible in a particularly advantageous manner, and with the least possible outlay, to achieve or ensure the formation of a planar sound field in the respective partial channels. Such a planar sound field is distinguished by the fact that, over the entire cross-sectional area of the respective partial channel, the same phase exists in every plane oriented perpendicular to the propagation direction of the air stream and of the respective partial channel. In other words, it is thus the case that, at a given point in time, at least substantially in each case the same sound pressure prevails in every such plane or cross-sectional plane or surface, oriented perpendicular to the flow direction of the air stream, of the partial channel. It is thus advantageously possible, by means of a measurement of the respective sound pressure in or at a single point, for the respective sound pressure in the entire cross-sectional plane of the partial channel that intersects the measurement point to be determined. In this way, it is thus advantageously possible for component and measurement outlay to be minimized. The formation of such a planar sound field may be dependent on a size and geometry or shape of the air channel or of the respective partial channel. By means of the arrangement and possibly a correspondingly adapted design of the at least one separating element in the air channel, it is advantageously possible for the formation of a planar sound field in the respective partial channels to be forced, whereby the described antisound method for reducing the sound pressure by means of the at least one second sound converter can advantageously be used or applied in a particularly effective, predictable and targeted manner.

In a further advantageous refinement of the invention, provision is made whereby the ventilation device has, for each of the multiple partial channels, at least one first sound transducer for detecting the respective sound pressure in the partial channel and at least one second sound transducer for generating the respective antisound pressure in the partial channel for reducing the respective sound pressure. In other words, provision is thus made whereby the number of first sound transducers and the number of second sound transducers in each case correspond at least to the number of partial channels, wherein both at least one first and at least one second sound transducer are arranged in each partial channel. This advantageously permits particularly targeted and precise use of the respective sound transducers, because a sound pressure or sound field has to be detected or monitored and influenced in each case only in a narrowly delimited region—specifically in the respective partial channel.

In a further advantageous refinement of the present invention, provision is made whereby the at least one second sound transducer is delimited with respect to an interior region of the air channel—or possibly with respect to an interior region of a respective partial channel—by a flow guard element which is acoustically permeable and which is at least substantially impermeable to the air stream. In other words, each of the second sound transducers is thus covered by the flow guard element, such that the air stream flowing through the air channel does not directly impinge on the respective second sound transducer. Here, it is however possible for the respective antisound generated and emitted by the second sound transducer to pass through the respective flow guard element and pass into the air channel in order to influence, in particular reduce, the sound pressure prevailing there caused in particular by the blower. The flow guard element may for example be connected to a side wall or to a housing of the air channel in a vicinity of the at least one second sound transducer. Since a respective shape of the at least one second sound transducer is predefined at least substantially by the required functionality, it is possible by means of the flow guard element, which can be shaped at least substantially freely, to advantageously effectively prevent additional noises or additional disturbance noise from arising or being generated as a result of an impingement of the air stream on the at least one second sound transducer or as a result of the at least one second sound transducer being flowed around by the air stream. The flow guard element may, depending on the specific use, be designed or adapted for example in a manner dependent on typical frequencies and/or flow conditions prevailing in the respective region of use. The arrangement of the flow guard element upstream of the at least one second sound transducer is particularly advantageous for the generation of the antisound required for reducing the sound pressure. What is particularly advantageous here is an avoidance of a pressure loss in the region of the at least one second sound transducer. Such a pressure loss would have an adverse effect on the noise source itself, that is to say in this case in particular the blower, because this would for example have to be operated with higher power, and thus with a higher sound intensity, in order to compensate for the pressure loss.

In a further advantageous embodiment of the present invention, provision is made whereby the at least one second sound transducer is mounted so as to be acoustically decoupled, in particular vibro-acoustically decoupled, from the air channel. In other words, provision is thus made whereby the at least one second sound transducer is not fastened directly to the air channel, that is to say for example to a side or delimiting wall or to a housing of the air channel. In this way, it is possible to advantageously prevent body-borne sound from being transmitted from the at least one second sound transducer to the air channel and/or for example to a housing of an air-conditioning appliance and thereby being able to pass into the interior compartment of the motor vehicle. To achieve this, the at least one second sound transducer may for example be mounted or held on another element or component and/or may be fixed or held indirectly by means of a corresponding damping element, and thus acoustically, in particular vibro-acoustically, decoupled. Correspondingly, provision is preferably made whereby the at least one second sound transducer is also mounted so as to be acoustically, in particular vibro-acoustically, decoupled from the entire channel system and/or from the blower. In this way, it is advantageously possible to prevent additional sound or additional noises from being introduced into the interior compartment of the motor vehicle as a result of the operation of the at least one second sound transducer.

It is advantageous if respective inner surfaces or walls of the air channel, preferably of the entire channel system, are designed so as to be adapted in terms of structural dynamics to the respective sound and flow conditions of the respective ventilation device. In this way, it is advantageously possible to prevent a passage of sound through the at least one second sound transducer. In other words, it can thus advantageously be achieved that, via the air channel or the channel system, no additional sound which would not arise or be present in an otherwise identical ventilation device without the respective at least one second sound transducer and/or the other elements and components of the ANC system is generated, radiated and/or introduced into the interior compartment of the motor vehicle.

It is particularly preferable if in particular the at least one second sound transducer is arranged such that, by means of the at least one second sound transducer and/or the arrangement thereof, no additional pressure loss is caused or induced in the air channel and/or in the channel system. In this way, it can advantageously be ensured that a provided, intended or desired ventilation action can be realized for example without an enlargement or increase in power of the blower despite the at least one second sound transducer that is provided and/or despite the ANC system that is provided.

In a further advantageous configuration of the present invention, provision is made whereby, by means of the at least one second sound transducer, the sound pressure can be reduced in a frequency range from 600 Hz to 2500 Hz. This frequency range dominates the overall level, wherein sound pressures at relatively high frequencies can be reduced using passive acoustic measures. Overall, it has been found that this frequency range is particularly relevant for an acoustic overall impression of the ventilation device. By means of the effectiveness of the at least one second sound transducer and the reduction of the sound pressure in this frequency range, it is thus possible in a particularly effective manner to achieve a reduction of the perceptible noise or of the perceptible sound intensity of the ventilation device and thus an improved acoustic impression in the interior compartment of the motor vehicle.

A method according to the invention serves for operating a ventilation device according to the invention. Here, it is thus the case that the sound pressure in the channel system is detected by means of the at least one first sound transducer, and the signal corresponding to the detected sound pressure is generated and transmitted to the at least one second sound transducer. Then, an antisound pressure or an antisound for reducing the sound pressure is generated in the channel system by means of the at least one second sound transducer in a manner dependent on the signal.

In a further advantageous configuration of the present invention, provision is made whereby a sound spectrum corresponding to the sound pressure is determined, and, in the generation of the antisound pressure, the at least one second sound transducer is controlled in a manner dependent on the determined sound spectrum. In other words, it is thus possible to perform or achieve targeted influencing in particular spectral or frequency ranges. In this way, a targeted adaptation of a resulting sound spectrum of the ventilation device or of an operating noise of the ventilation device can thus be achieved. Particularly preferably, the at least one second sound transducer for generating the antisound pressure may be controlled such that, resulting as a sum or superposition of the sound pressure and of the antisound pressure, effectively at least substantially white noise and/or a noise or signal commonly defined and/or perceived as being of high quality results or is realized. In any case, the resultant overall noise may be approximated to such noise in comparison with an overall noise not influenced by the operation of the ANC system. This may be realized for example by means of a lowering of the level in certain spectral ranges and/or spectral filling in other spectral ranges. In other words, it is thus possible in an effective manner to perform spectral line filling of the particular sound spectrum.

For example, particular frequencies or frequency ranges with particularly high amplitudes may be dampened with targetedly greater intensity than frequencies or frequency ranges which already have a relatively low amplitude in the particular sound spectrum. In this way, it is advantageously possible to achieve a particularly positive effect on respective occupants of the motor vehicle. For example, a calming, relaxing action with little distraction can be achieved, whereby increased safety in controlling the motor vehicle in traffic can also be achieved overall.

In a further advantageous configuration of the present invention, provision is made whereby, in the generation of the antisound pressure, the at least one second sound transducer is controlled in a manner dependent on a temperature of the air stream flowing through the air channel. Alternatively or in addition, in the generation of the antisound pressure, the at least one second sound transducer may be controlled in a manner dependent on a setting of an air-conditioning device of the ventilation device or of the motor vehicle or in a manner dependent on target temperature set or predefined for the interior compartment and/or on an actual temperature of the interior compartment of the motor vehicle. The resulting overall or operational noise of the ventilation device can thus be adapted to the respective temperature. In this way, by means of corresponding control of the at least one second sound transducer, a temperature sensation experienced by respective occupants of the motor vehicle can be influenced in targeted fashion. In this way, it is advantageously possible for an air-conditioning function to be assisted and/or for a particular comfort level for the respective occupants of the motor vehicle to be achieved in a shorter time and/or with reduced air-conditioning power.

Further features of the invention will emerge from the claims, from the figures and from the description of the figures. The features and feature combinations mentioned above in the description, and the features and feature combinations mentioned below in the description of the figures and/or shown in the figures alone may be used not only in the respectively specified combination but also in other combinations or individually.

The invention will now be discussed in more detail on the basis of preferred exemplary embodiments and with reference to the drawings, which relate to the present invention.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 shows, in a schematic illustration, a diagrammatic depiction of a frequency-dependent damping characteristic of a ventilation device without reduction of a sound pressure by means of a sound transducer.

DETAILED DESCRIPTION OF THE DRAWINGS

Identical or functionally identical elements are denoted in each case by the same reference designations.

Figure 1:
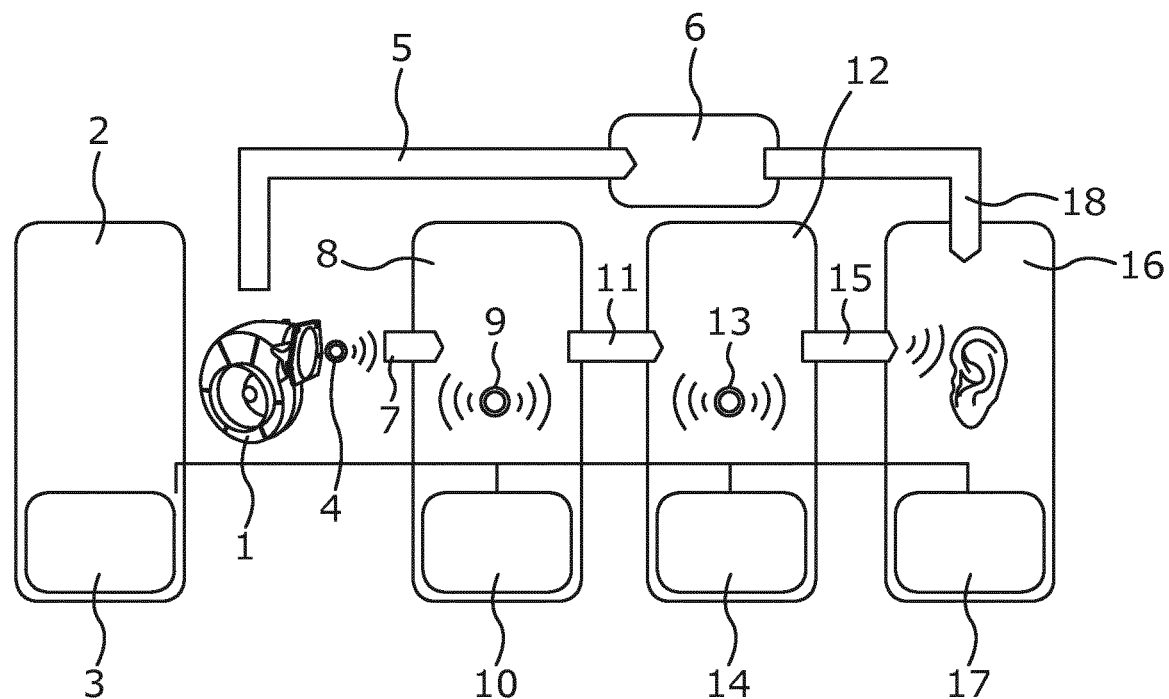
FIG. 1 shows, in a schematic illustration, an effect chain of a ventilation arrangement for an interior compartment of a motor vehicle.

FIG. 1 shows a schematic illustration of an effect chain of a ventilation arrangement for an interior compartment of a motor vehicle. A major constituent part of the ventilation arrangement is in this case a blower 1. The blower 1 draws the air that it conveys through an induction arrangement 2, wherein a pressure loss 3 occurs in a corresponding induction region. Operation of the blower 1 causes sound generation 4 in or at the blower 1. Sound that arises or is generated in this way is, in a real motor vehicle in which the blower 1 may be arranged or installed, transmitted, transferred or conducted by acoustic transmission to other components and into other regions of the motor vehicle. This relates firstly to sound transmission 5 from the blower 1 to an instrument panel 6 of the motor vehicle. Secondly, there is sound transmission 7 from the blower 1 to an air guide 8. The air guide 8 may be connected to the blower 1, and serves for guiding an air stream generated by the blower 1.

As the air stream generated by the blower 1 flows through the air guide 8, sound generation 9 occurs. The sound generation 9 may arise for example at or in a flap box which is arranged for diverting and/or distributing the air stream in the air guide 8 and/or further air-guiding or air-directing elements owing to a respective impingement of flow or flow diversion and/or turbulence that arises here. From the air guide 8, sound transmission 11 takes place to a vent 12, which may constitute a transition or an interface between the air guide 8 and a ventilated interior compartment 16 of the motor vehicle. The vent 12 is thus impinged on and flowed through by the air stream generated by means of the blower 1, wherein sound generation 13 occurs here also. A pressure loss 14 also occurs at the vent 12.

From the vent 12, sound transmission 15 takes place to or into the interior compartment 16, in which, for example, respective occupants of the motor vehicle may be present. As the air stream enters or passes over into the interior compartment 16, the air stream disperses, and a pressure loss 17 also occurs here. Sound is however introduced into the interior compartment 16 not only as a result of the sound transmission 15 from the vent 12 but also by means of sound transmission 18 from the instrument panel 6.

The sound that is thus guided, conducted or introduced by various paths into the interior compartment 16 may possibly be picked up or perceived by the occupants. This may constitute an influencing or burdening of the occupants which is undesired for example for safety and/or comfort reasons. In numerous operating states, in particular of the blower 1, the sound which is effected or caused by the ventilation of the interior compartment 16 and which passes to the occupants in the interior compartment 16, that is to say for example in a passenger cell of the motor vehicle, is dominated by the sound component generated by the blower 1. This may be the case in particular in the case of relatively low air flow rates being transported by the air stream, and correspondingly in the case of low flow speeds. These conditions typically prevail in a steady-state situation, that is to say during ventilation operation in which a prevailing actual state in the interior compartment 16 is at least substantially maintained or to be maintained. Such an actual state may for example relate to an oxygen concentration and/or an air temperature in the interior compartment 16.

Figure 2:
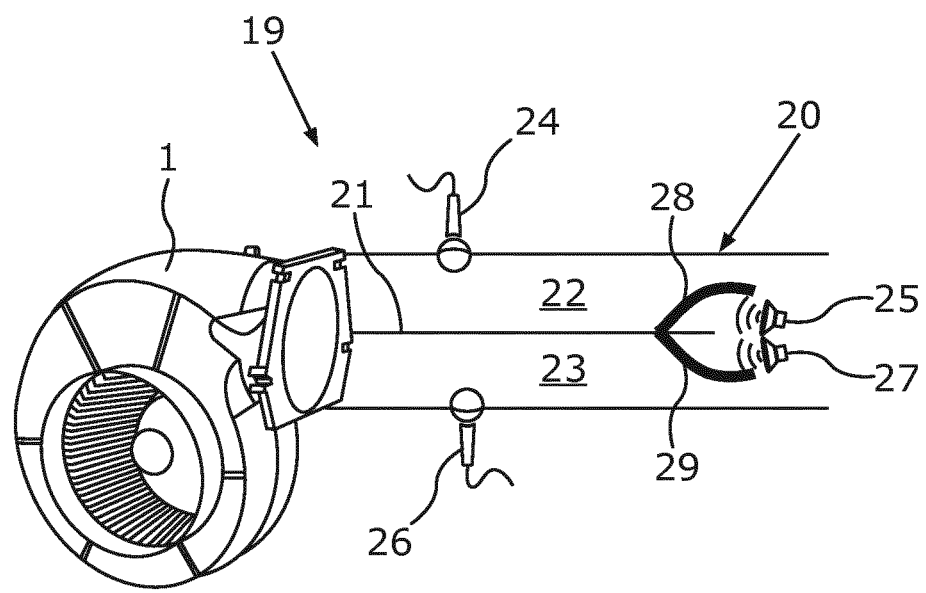
FIG. 2 shows, in a schematic illustration, a first example of a ventilation device.

By means of a targeted elimination or reduction of the sound generated or caused by the operation of the blower 1 or of the corresponding noises, it is thus advantageously possible to achieve a particularly effective reduction of the acoustic burden in the interior compartment 16 in a particularly large number of operating states and situations that typically make up a significant time fraction of an operating duration of the motor vehicle. Such a reduction of the acoustic burden may be achieved in a particularly effective manner for example by means of a first ventilation device 19 shown in a schematic illustration in FIG. 2. In the present case, the first ventilation device 19 comprises the blower 1 and an air channel 20 adjoining the blower. The air channel 20 may be part of the air guide 8 and thus for example part of a more comprehensive, possibly branched channel system. The air stream generated by means of the blower 1 can flow through the air channel 20 and be guided by the air channel for example to the vent 12. The vent 12 may for example be provided for a central arrangement in or on the instrument panel 6 or for a lateral arrangement in an edge region of the instrument panel 6. The air channel 20 may basically have any desired shape or extent, and transport or guide the air stream for example to any desired point of the motor vehicle.

In the present case, the air channel 20 is divided into a first partial channel 22 and a second partial channel 23 by a separating element 21. It is preferably possible for the two partial channels 22, 23 to be of the same size and design and of the same cross section and/or to extend parallel to one another. By means of the separating element 21, the air stream generated by the blower 1 is also divided, such that the two partial channels 22, 23 are preferably flowed through in equal parts or with equal intensity. It is however alternatively possible for the two partial channels 22, 23 to targetedly be designed differently, and/or for flow to pass through, or to be caused to pass through, the two partial channels with targetedly different intensity. This may be necessitated or made necessary for example by structural restrictions such as for example particular structural space or packaging requirements of the motor vehicle, or for example an asymmetry in the air guide 8.

Owing to the splitting or division of the air channel 20 into the two partial channels 22, 23, it can be realized or ensured that the sound originating in particular from the blower 1 forms a planar sound field in each of the two partial channels 22, 23. Such a planar sound field is technically particularly easy to manage from a mathematical aspect, in terms of planning and in physical use.

Furthermore, in the present case, the first ventilation device comprises two first sound transducers and two second sound transducers. A first of the two first sound transducers is in this case in the form of a first microphone 24, which is arranged in or at the first partial channel 22. A sound pressure prevailing in the first partial channel 22 can be detected or measured by means of the first microphone 24. Since, owing to the structural and geometrical design of the air channel 20, a respective planar sound field arises or is present in the two partial channels 22, 23 during operation of the blower 1, the single first microphone 24 is sufficient here for determining this planar sound field or the corresponding sound pressure, because in each case at least substantially, and for practical applications sufficiently exactly, the same sound pressure, that is to say a sound pressure which is spatially constant for a particular point in time, prevails over an entire cross-sectional area of the first partial channel 22—and analogously also over an entire cross-sectional area of the second partial channel 23.

The sound pressure measured or determined by means of the first microphone 24 may be converted into a signal corresponding thereto and transmitted for example to a regulator (not illustrated here) or a control unit (not illustrated here). A first of the two second sound transducers, which in the present case is in the form of a first loudspeaker 25, can be controlled or activated by the regulator or the control unit in a manner dependent on the signal. Here, the first loudspeaker 25 is arranged within the air channel 20 such that sound generated by the first loudspeaker 25 is emitted or radiated into the first partial channel 22. The first loudspeaker 25 is in this case controlled such that the sound emitted by it is in anti-phase with respect to the sound propagating from the blower 1 along the first partial channel 22. The sound emitted by the first loudspeaker 25 thus constitutes antisound, wherein, as a result of an interaction between the sound propagating from the blower 1 along the first partial channel 22 and the antisound generated by the first loudspeaker 25, overall or effectively, an overall sound or an overall operating noise of the first ventilation device 19 results or takes effect. This overall operating noise is in this case reduced in terms of its sound intensity or its sound pressure in relation to an operating noise of the first ventilation device 19 that would result or take effect without the use of the first microphone 24 and the first loudspeaker 25.

Analogously or correspondingly, the second of the first sound transducers is in the present case in the form of a second microphone 26, and the second of the two second sound transducers is in the form of a second loudspeaker 27. The second microphone 26 is arranged in or at the second partial channel 23 so as to detect or measure the sound propagating from the blower 1 along the second partial channel 23. The second microphone 26 may also transmit a signal corresponding to the sound or sound pressure detected by it for example to the or a regulator or to the or a control unit. In a manner dependent on this signal transmitted by the second microphone 26, the second loudspeaker 27 is controlled or activated such that the antisound generated by it reduces, lessens or at least partially cancels out the sound pressure propagating from the blower 1 in the second partial channel 23.

Altogether, the two microphones 24, 26, the one or more regulators or the control unit or the control units and the two loudspeakers 25, 27 thus form an antinoise or antisound system (ANC system, "active noise cancellation") for active noise suppression. By means of this ANC system, the operating noise of the first ventilation device 19 that ultimately passes into the interior compartment 16 of the motor vehicle can be reduced.

In the present case, the first ventilation device 19 furthermore comprises a first flow guard element 28 and a second flow guard element 29. The first flow guard element 28, in the present case, covers the first loudspeaker 25 with respect to the first partial channel 22 and/or with respect to the air stream generated by the blower 1. The air stream is thus diverted, conducted or guided by the first flow guard element around the first loudspeaker 25, such that the air stream does not impinge directly on the first loudspeaker 25. In this way, sound generation otherwise caused by such an impingement can advantageously be avoided. In the same way, the second flow guard element 29 covers the second loudspeaker 27 with respect to the second partial channel 20 and/or with respect to that component of the air stream generated by the blower 1 which flows through the second partial channel.

The two flow guard elements 28, 29 are at least substantially impermeable to the air stream generated by the blower 1. At the same time, the two flow guard elements 28, 29 are however permeable to the antisound generated in each case by the first loudspeaker 25 and by the second loudspeaker 27. The at least substantial permeability of the flow guard elements 28, 29 to the air stream may for example mean that, when the respective flow guard element 28, 29 is impinged on one side by the air stream, a respective resulting air flow speed on a side of the respective flow guard element 28, 29 averted from the impinged-on side is reduced by at least 75%, preferably by at least 90%, in relation to a flow speed of the impinging air stream.

Figure 3:
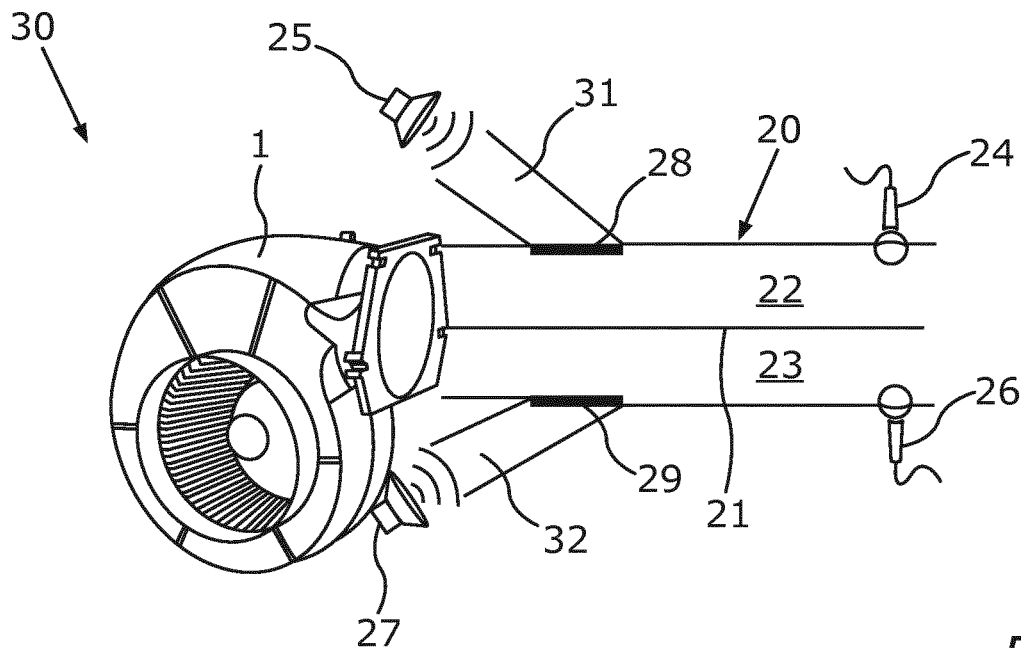
FIG. 3 shows, in a schematic illustration, a second example of a ventilation device.

FIG. 3 shows a second ventilation device 30 in a schematic illustration. The second ventilation device 30 comprises the elements that have already been discussed in conjunction with the first ventilation device 19. By contrast to the first ventilation device 19, the second ventilation device 30 however has an alternative arrangement or an alternative construction. In the present case, the second ventilation device 30 has a first antisound feed 31, which branches off from the first partial channel 22. The first loudspeaker 25 is arranged in an end region, averted from the first partial channel 22, of the first antisound feed 31. The antisound generated by the first loudspeaker of 20 is thus fed through the first antisound feed 31 to the first partial channel 22. Here, the first flow guard element 28 is arranged at or in a transition region between the first antisound feed 31 and the first partial channel 22. The first flow guard element 28 can in this case thus effectively form a partial region of a side wall of the first partial channel 22. The first flow guard element 28 preferably completely covers the opening, facing in the first partial channel 22, of the first antisound feed 31.

Like the first ventilation device 19, in the present case the second ventilation device 30 is also of substantially symmetrical design. Accordingly, it is also the case that an antisound feed is provided so as to branch off from the second partial channel 23, which antisound feed is referred to as second antisound feed 32. The second loudspeaker 27 is arranged in or at an end region, averted from the second partial channel 23, of the second antisound feed 32. Here, the second loudspeaker 27 is arranged or oriented such that the antisound emitted by it is guided through the second antisound feed 32 into the second partial channel 23. The transition between the second antisound feed 32 and the second partial channel 23 is covered by the second flow guard element 29.

Owing to the respective coverage of the opening, facing toward the respective partial channel 22, 23, of the respective antisound feed 31, 32 by means of the flow guard elements 28, 29, a pressure loss as the air stream flows past the openings can advantageously be avoided.

In the case of the second ventilation device 30 shown in FIG. 3, proceeding from the blower 1 in the flow direction of the air stream, the first loudspeaker 25 is arranged upstream of the first microphone 24 and the second loudspeaker 27 is arranged upstream of the second microphone change 26, and accordingly, it is possible here, for the ANC system to operate on the basis of feedback. Since the sound-intensity-reducing action of the ANC system is particularly effective in particular in the steady-state situation, in which at least substantially uniform or consistent noise or sound circumstances or conditions prevail and virtually no rapid changes in the circumstances or conditions occur, this arrangement of the ANC system or of its individual components or elements, too, can be used effectively in practice in the second ventilation device 30.

Irrespective of the specific embodiment or configuration, it is possible by means of the respective ANC system to not only achieve a reduction of the sound pressure or of the sound intensity of the operating noises of the respective ventilation device 19, 30 that reach the interior compartment 16. It is additionally or alternatively also possible for a sound quality or a spectrum of the corresponding sound or operating noise to be influenced or modified in targeted and controlled fashion. In particular, for example by means of spectral filling of the sound or frequency spectrum or of the operating noise, it is possible to achieve an improved sound quality. Likewise possible is control of the loudspeakers 25, 27, and thus the generation of the respective antinoise or antisound pressure, in a manner dependent on an air-conditioning state of the interior compartment 16 and/or on a predefined air-conditioning target for the interior compartment 16. In this way, it is for example possible for a noise pattern, which assists a temperature sensation and/or an air-conditioning action, of the respective ventilation device 19, 30 to be generated or realized. These measures for adapting the noise pattern and/or for modifying, in particular improving, the sound quality may be summarized under the expression of active sound design (ASD). To achieve the most optimum possible effect here, provision may be made whereby, in particular for particular frequencies and/or frequency ranges, an acoustic transfer function of individual elements of the respective ventilation device 19, 30, such as for example of the air channel 20, and/or of the entire respective ventilation device 19, 30 is determined. The control or activation of the loudspeakers 25, 27 may then be performed in a manner dependent on this acoustic transfer function.

The channel system, in particular the air channel 20, may entirely or partially be produced by means of a blow molding method. The channel system may comprise the first antisound feed 31 and/or the second antisound feed 32.

Figure 4:
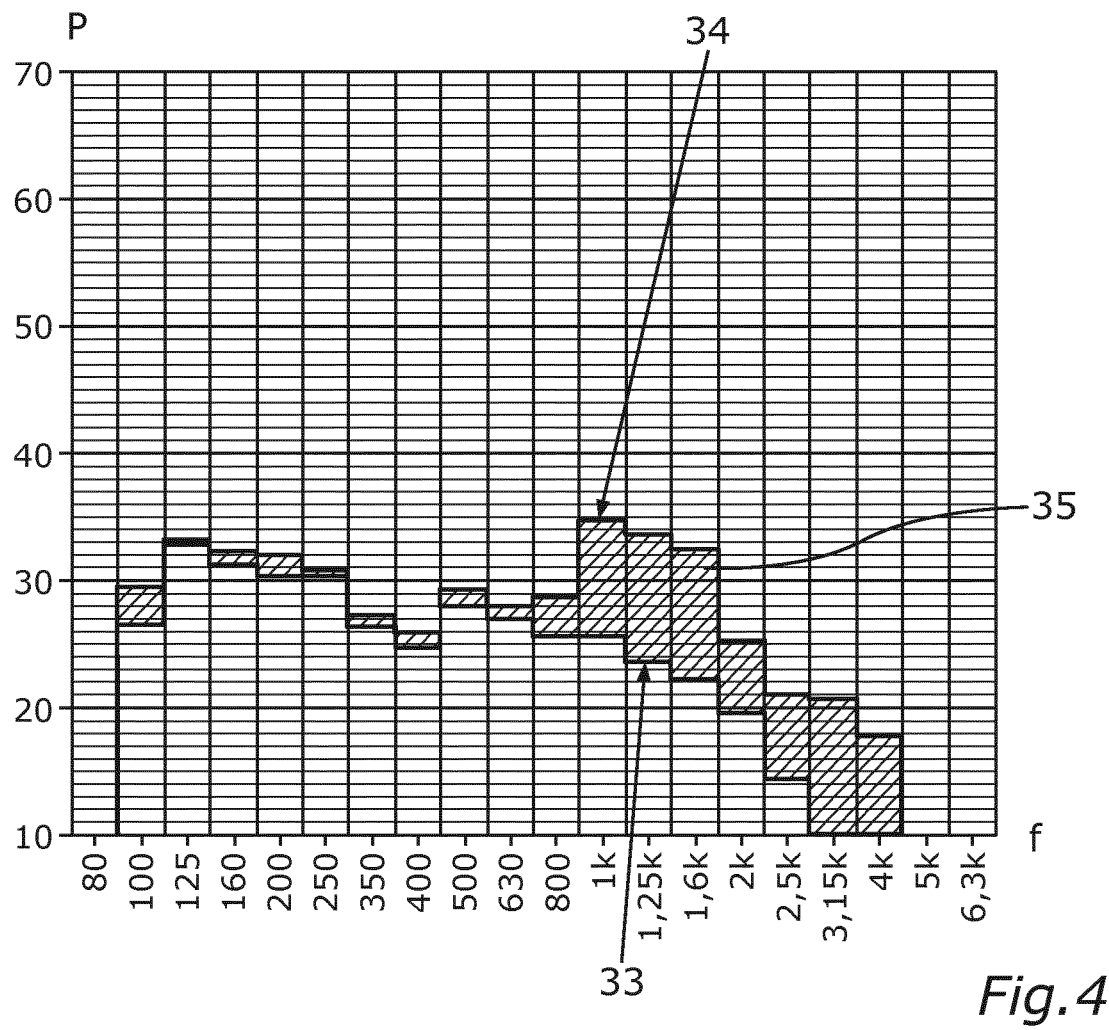
FIG. 4 shows, in a schematic illustration, a diagrammatic depiction of a potential for noise reduction of a ventilation device.

FIG. 4 shows, in a schematic illustration, a diagrammatic depiction of a potential for noise reduction of a ventilation device for the interior compartment 16 of the motor vehicle. Here, a frequency f of the sound passing through the ventilation device is plotted in Hz on an abscissa. A sound power P is plotted in dB(A) on an ordinate. A first curve of the diagram indicates a frequency-dependent profile of a passive sound power 33 which arises in the case of a passive flow through the blower 1 and a flap box of the respective ventilation device without operation of an ANC system. A second curve of the diagram indicates a frequency-dependent profile of an operational sound power 34 which arises in the case of a flow through the respective ventilation device during operation of the blower 1—likewise without an ANC system being operated or activated. A region indicated between the passive sound power 33 and the operational sound power 34 represents an ANC potential 35, which thus indicates that component of the operational sound power 34 that is to be eliminated by means of the actively operated ANC system. A reduction of the sound power to below a level defined by the passive sound power 33 is duly possible in principle but, in particular in a region close to the blower 1, is not necessary for effective noise reduction from the perspective of the occupant. As can be seen from the illustration in FIG. 4, there is significant potential for noise reduction in particular in a frequency range between approximately 600 to 700 Hz and approximately 4500 Hz, in particular in a frequency range between 900 Hz and 2500 Hz.

FIG. 5 shows, in a schematic illustration, a diagrammatic depiction of a frequency-dependent damping characteristic of a ventilation device operated without ANC system. Here, too, the frequency f is plotted in Hz on an abscissa and is indicated in accordance with a logarithmic scale. An insertion loss IL is plotted in dB on an ordinate in the diagram shown in FIG. 5. This diagram firstly shows non-deadened profile 36 which arises without passive acoustic material. Secondly, non-deadened profile 37 is illustrated which arises with a passively sound-deadening and/or sound-deadening acoustic material. It is possible to clearly see a significant drop in the insertion loss IL in a frequency range around 1600 Hz, which is caused by the respective geometry, in particular the respective cross-sectional area, of the respective air guide. A corresponding preferred effective range 38 of the respective ANC system is accordingly marked.

LIST OF REFERENCE CHARACTERS

1 Blower
2 Induction arrangement
3 Pressure loss
4 Sound generation
5 Sound transmission
6 Instrument panel
7 Sound transmission
8 Air guide
9 Sound generation
10 Pressure loss
11 Sound transmission
12 Vent
13 Sound generation
14 Pressure loss
15 Sound transmission
16 Interior compartment
17 Pressure loss
18 Sound transmission
19 First ventilation device
20 Air channel
21 Separating element
22 First partial channel
23 Second partial channel
24 First microphone
25 First loudspeaker
26 Second microphone
27 Second loudspeaker
28 First flow guard element
29 Second flow guard element
30 Second ventilation device
31 First antisound feed
32 Second antisound feed
33 Passive sound power
34 Operational sound power
35 ANC potential
36 Non-deadened profile
37 Deadened profile
38 Effective range
f Frequency
P Sound power
IL Insertion loss The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A ventilation device for an interior compartment of a motor vehicle, comprising:
    a channel system which includes an air channel;
    a blower, wherein an air stream is generatable in the channel system by the blower;
    at least one first sound transducer;
    at least one second sound transducer;
    wherein a sound pressure in the channel system is detectable by the at least one first sound transducer and wherein a signal corresponding to a detected sound pressure is transmittable to the at least one second sound transducer by the at least one first sound transducer;
    wherein an antisound pressure for reducing the detected sound pressure is generatable by the at least one second sound transducer dependent on the signal; and
    a flow guard element, wherein the at least one second sound transducer is covered by the flow guard element with respect to the air stream, wherein the flow guard element is acoustically permeable and is at least substantially impermeable to the air stream such that only a portion of the air stream passes through the flow guard element.

2. The ventilation device according to claim 1, wherein the air channel is divided by a separating element into a first partial channel and a second partial channel.

3. The ventilation device according to claim 2, wherein the first partial channel and the second partial channel are delimited with respect to one another in an air-impermeable manner at least in regions.

4. The ventilation device according to claim 3, wherein the first partial channel and the second partial channel are delimited with respect to one another parallel to a flow direction of the air stream.

5. The ventilation device according to claim 2, wherein the first partial channel and the second partial channel each have a first sound transducer and a second sound transducer.

6. The ventilation device according to claim 1, wherein the at least one second sound transducer is mounted such that the at least one second sound transducer is acoustically decoupled from the air channel.

7. The ventilation device according to claim 1, wherein the detected sound pressure is reduceable in a frequency range from 600 Hz to 2500 Hz by the at least one second sound transducer.

8. A method for operating the ventilation device according to claim 1, comprising the acts of:
    detecting the sound pressure in the channel system by the at least one first sound transducer;
    generating the signal corresponding to the detected sound pressure by the at least one first sound transducer;
    transmitting the signal by the at least one first sound transducer to the at least one second sound transducer; and
    generating the antisound pressure by the at least one second sound transducer dependent on the signal and reducing the detected sound pressure in the channel system by the antisound pressure.

9. The method according to claim 8 further comprising the acts of:
    determining a sound spectrum corresponding to the detected sound pressure; and
    in the act of generating, controlling the at least one second sound transducer dependent on the determined sound spectrum.

10. The method according to claim 8 further comprising the act of:
    in the act of generating, controlling the at least one second sound transducer dependent on a temperature of the air stream.

11. The method according to claim 9 further comprising the act of:
    in the act of generating, controlling the at least one second sound transducer dependent on a temperature of the air stream.

* * * * *